US012694392B2

(12) United States Patent
Singh et al.

(10) Patent No.: US 12,694,392 B2
(45) Date of Patent: Jul. 28, 2026

(54) VARIANT CARD

(71) Applicant: Bank of America Corporation,
Charlotte, NC (US)

(72) Inventors: Jitender Singh, Robbinsville, NJ (US);
Sapna Yadav, Gujarat (IN); Amol Patil, New Delhi (IN)

(73) Assignee: Bank of America Corporation,
Charlotte, NC (US)

( * ) Notice: Subject to any disclaimer, the term of this patent is extended or adjusted under 35 U.S.C. 154(b) by 34 days.

(21) Appl. No.: 18/214,174

(22) Filed: Jun. 26, 2023

(65) Prior Publication Data

US 2024/0428227 A1     Dec. 26, 2024

(51) Int. Cl.
G06Q 20/34          (2012.01)
(52) U.S. Cl.
CPC .................................. G06Q 20/351 (2013.01)
(58) Field of Classification Search
CPC ................................................... G06Q 20/351
USPC ......................................................... 705/41
See application file for complete search history.

(56) References Cited

U.S. PATENT DOCUMENTS

| | | | | | |
|---|---|---|---|---|---|
| 6,990,470 | B2 * | 1/2006 | Hogan | ............... | G06Q 20/3821 |
| | | | | | 705/64 |
| 7,319,986 | B2 * | 1/2008 | Praisner | ............... | G07F 7/1008 |
| | | | | | 705/40 |
| 8,204,829 | B2 | 6/2012 | Alvarez et al. | | |
| 8,602,301 | B1 | 12/2013 | Blossom | | |

| | | | | | |
|---|---|---|---|---|---|
| 8,954,353 | B2 * | 2/2015 | Faith | ...................... | G06Q 20/40 |
| | | | | | 705/67 |
| 9,972,005 | B2 * | 5/2018 | Wong | .................... | H04L 9/0869 |
| 10,068,287 | B2 * | 9/2018 | Nelsen | ................. | G06Q 20/351 |
| 11,893,549 | B2 * | 2/2024 | Lacoss-Arnold | ........................... | |
| | | | | | G06Q 20/4016 |
| 11,915,229 | B2 * | 2/2024 | Singh | ..................... | G06Q 20/16 |
| 12,093,946 | B2 * | 9/2024 | Shanmugam | ...... | G06Q 20/3829 |
| 2008/0167986 | A1 * | 7/2008 | Plant | ................... | G06Q 20/227 |
| | | | | | 705/39 |
| 2011/0307377 | A1 * | 12/2011 | Nelsen | ................. | G06Q 20/348 |
| | | | | | 705/41 |
| 2014/0180930 | A1 * | 6/2014 | Hurry | .............. | H04N 21/47815 |
| | | | | | 705/41 |
| 2015/0180836 | A1 * | 6/2015 | Wong | ................. | G06Q 20/3672 |
| | | | | | 713/172 |

(Continued)

FOREIGN PATENT DOCUMENTS

| | | | | | |
|---|---|---|---|---|---|
| CN | | 113474801 | A  * | 10/2021 | ......... G06Q 30/0229 |
| WO | WO-2019031716 | A2 * | 2/2019 | | |

OTHER PUBLICATIONS

Vishwas Patil and R. K. Shyamasundar, "An efficient, secure and delegable micro-payment system," IEEE International Conference on e-Technology, e-Commerce and e-Service, 2004. EEE '04. 2004, Taipei, Taiwan, 2004, pp. 394-404. (Year: 2004).*

*Primary Examiner* — Virpi H Kanervo
(74) *Attorney, Agent, or Firm* — Banner & Witcoff, Ltd.

(57)          ABSTRACT

Aspects of the disclosure relate to generating digital variant cards to share established credit limits without an issuing organizations intervention or dependencies. The generated variant cards may share a portion of an authorized users credit limit. The variant cards may be tied to sub user devices. Tokenization may be used in digital variant card generation. Variant cards may include use of a dynamic card verification values to authenticate variant card transactions.

2 Claims, 6 Drawing Sheets

(56) References Cited

U.S. PATENT DOCUMENTS

| | | | | |
|---|---|---|---|---|
| 2015/0254647 A1* | 9/2015 | Bondesen | ........... | G06Q 20/385 |
| | | | | 705/41 |
| 2016/0321663 A1* | 11/2016 | Batlle | .................. | G06Q 20/405 |
| 2017/0132719 A1* | 5/2017 | Rogers | ................... | G06Q 40/12 |
| 2018/0158057 A1* | 6/2018 | Kirch | .................. | G06Q 20/405 |
| 2022/0114582 A1* | 4/2022 | Shanmugam | ......... | G06Q 20/36 |
| 2023/0102161 A1* | 3/2023 | Dey | ..................... | G06Q 20/351 |
| | | | | 705/44 |
| 2023/0252450 A1* | 8/2023 | de Anda | ............. | G06Q 20/351 |
| | | | | 705/40 |
| 2023/0334467 A1* | 10/2023 | Cline | .................. | G06Q 20/065 |

* cited by examiner

602   Receive Variant Card Generation Request

604   Determine Contract Condition

606   Transmit Token Request

608   Receive Token Identification

610   Generate Variant Card

VARIANT CARD

BACKGROUND

Aspects of the disclosure relate to electrical computers, systems, and devices for generating payment cards for authorized sub users. Currently, for users to share a user's payment account or business account, intervention from the issuing organization is required. This intervention may be in the form of an onboarding process that requires information from a potential sub user that is reviewed and approved by the issuing organizations approval process. This onboarding approval process is time consuming for all parties involved. There is a need to develop the capability for account owners to generate sub accounts with associated secure payment cards to remove this bottleneck.

SUMMARY

In light of the foregoing background, the following presents a simplified summary of the present disclosure in order to provide a basic understanding of various aspects of the disclosure. The summary is not limiting with respect to the exemplary aspects of the disclosure described herein and is not an extensive overview of the disclosure. It is not intended to identify key or critical elements of or steps in the disclosure or to delineate the scope of the disclosure. Instead, as would be understood by a person of ordinary skill in the art, the following summary merely presents some concepts of the disclosure in simplified form as a prelude to the more detailed description provided below. Moreover, sufficient written descriptions of the embodiments of this application are disclosed in the specification throughout this application along with exemplary, non-exhaustive, and non-limiting manners and processes of making and using the inventions, in such full, clear, and concise, and exact terms in order to enable skilled artisans to make and use the inventions without undue experimentation and sets forth the best mode contemplated by the inventor for carrying out the inventions.

Aspects of this disclosure address one or more shortcomings in the industry by providing a method and system for generating sub user accounts without an issuing organizations intervention or dependencies by generating a digital variant card for each individual sub user. The generated variant accounts may share a predetermined portion of the authorized users credit limit.

In accordance with one or more embodiments, tokenization may be used to create digital variant cards for users. The variant cards may be tied to sub user devices. The variant card may include use of a dynamic card verification value to authenticate variant card transactions.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is also noted that these connections are general and, unless specified otherwise, may be direct or indirect, wired or wireless, and that the specification is not intended to be limiting.

Figure 1:
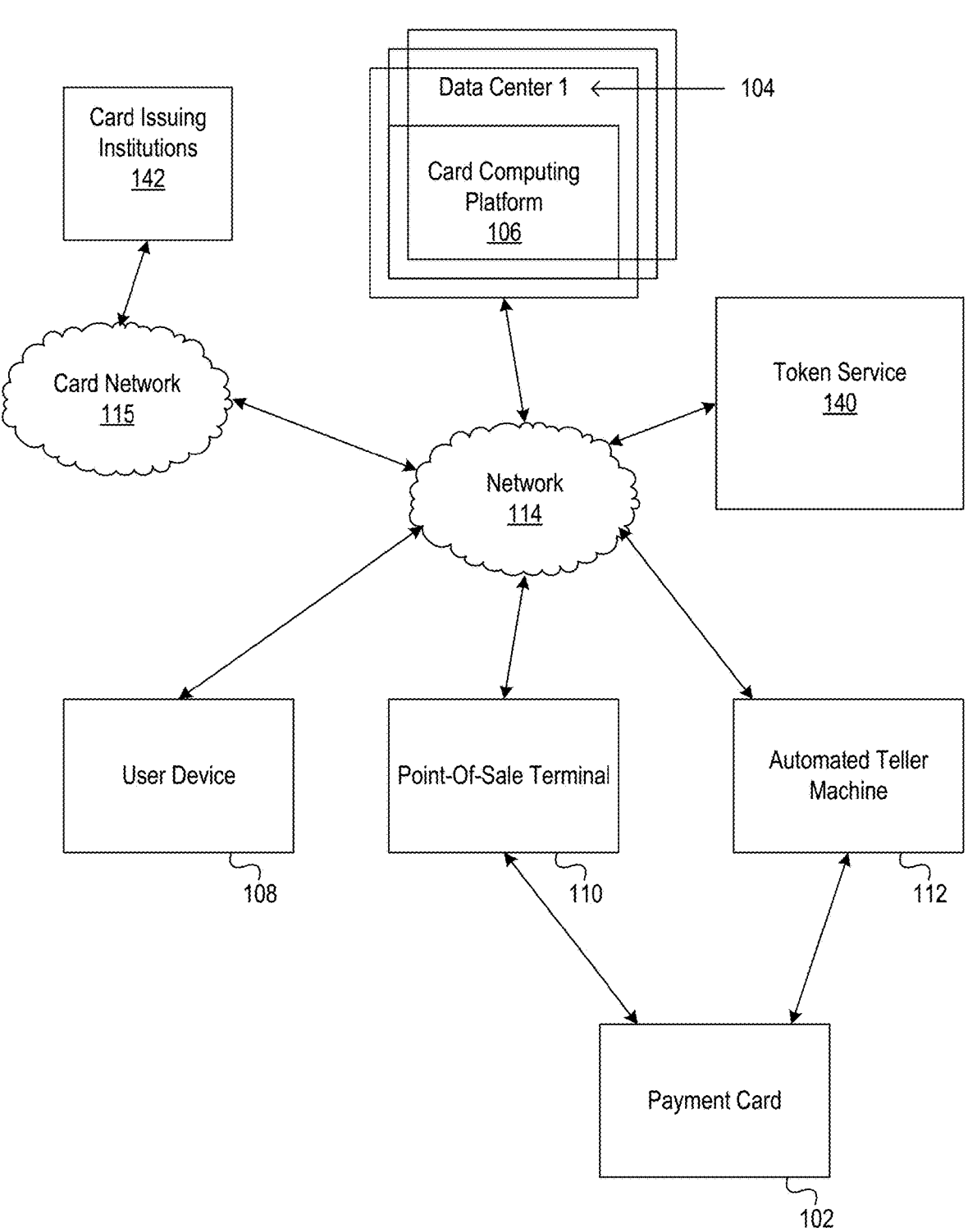
FIG. 1 illustrates a computing environment for generation and use of variant cards in accordance with one or more aspects described herein.

FIG. 1 depicts a computing environment for generation and use of variant cards with various embodiments of the disclosure. Computing environment 100 may include one or more data centers and one or more computing devices, including computing devices located at or within such data centers and computing devices not located at or within such data centers. For example, computing environment 100 may include a first data center 104. Data center 104 may include a card computing platform 106. Computing environment 100 also may include a user device 108, a point-of-sale terminal 110, and/or an automated teller machine 112.

Data center 104 may be a distinct and physically separate data center operated by and/or otherwise associated with an organization, such as a financial institution. In addition, data center 104 may house a plurality of server computers and various other computers, network components, and devices.

In an aspect of the disclosure, a card computing platform 106 may be configured to provide one or more portal interfaces to one or more user devices 108 and/or may be configured to authenticate and/or monitor one or more variant cards and associated acceptance devices such as point-of-sale terminals, and/or automated teller machines.

In another aspect of the disclosure, card computing platform 106 may be configured to generate payment cards based on user instructions. The generated cards may be tied to the user account and may fully transact based on user established authorizations. In one instance, the generated cards may be digital payment cards.

In some arrangements, data center 104 may include one or more client account servers, which may be configured to store and/or maintain information associated with one or more client accounts. For example, the client account server(s) may be configured to store and/or maintain information associated with one or more financial accounts associated with one or more customers of a financial institution, such as account balance information, transaction history information, and/or the like. In an embodiment, client account server(s) may store information regarding the background type and branding of customers issued payment cards. This information may also include digital images of a customers issued payment cards to be used for authentication purposes in real-time financial transactions.

Additionally or alternatively, client account server(s) may include and/or integrate with one or more client support servers and/or devices, such as one or more customer service representative devices used by one or more customer service representatives of an organization (which may, e.g., be a financial institution operating data center 104), to connect one or more customers of the organization with one or more customer service representatives of the organization via one or more telephone support sessions, chat support sessions, and/or other client support sessions.

In one or more arrangements, a user device 108 may be any type of computing device capable of receiving a user interface, receiving input via the user interface, and communicating the received input to one or more other computing devices. For example, a user device may, in some instances, be and/or include server computers, desktop computers, laptop computers, tablet computers, smart phones, or the like that may include one or more processors, memories, communication interfaces, storage devices, and/or other components. As noted above, and as illustrated in detail below, a user device may, in some instances, be one or more special-purpose computing devices configured to perform specific functions. In an embodiment, user device 108 may receive alerts or communications from card computing platform 106 regarding current or past transactions.

In an embodiment, user device 108 may communicate with card computing platform 106 to provide a user with information related to current or previous transactions. In some instances, in addition to being configured to provide users with transactional information, card computing platform 106 also may be configured to provide a mobile banking portal associated with the financial institution to various customers of the financial institution and/or their associated mobile computing devices. Such portals may, for instance, provide customers of the financial institution with access to financial account information (e.g., account balance information, purchase transactions, account statements, recent transaction history information, or the like) and/or may provide customers of the financial institution with menus, controls, and/or other options to schedule and/or execute various transactions (e.g., online bill pay transactions, person-to-person funds transfer transactions, or the like). In some instances, the portal may allow users to track and change criteria for any generated payment card attached to their user account. In an aspect of the disclosure, user device 108 may also communicate with computing platform 106 using telephone (POTS), and/or a cellular network in addition to digital data networks. For example, card computing platform 106 may connect to user device 108 via a cellular network and transmit a message such as "Please confirm card generation details . . . by pressing 1" or some similar type of messaging.

In an embodiment, a card computing platform 106 may be configured to provide one or more interfaces that allow for configuration and management of one or more cards, computing devices, and/or computer systems included in the computing environment. In yet another embodiment, a computing environment also may include one or more computing platforms. For example, a computing environment may include a card computing platform 106. As illustrated in greater detail below, a card computing platform 106 may include one or more computing devices configured to perform one or more of the functions described herein. For example, a card computing platform 106 may include one or more computers (e.g., laptop computers, desktop computers, servers, server blades, or the like). The computing environment also may include one or more networks 114, which may interconnect one or more of card alert computing platforms, a user device 108, a point-of-sale terminal 110, and/or an automated teller machine 112. For example, a computing environment may include a network 114, which may include one or more public networks, one or more private networks, and/or one or more sub-networks (e.g., local area networks (LANs), wide area networks (WANs), or the like). In addition, as discussed above, network 114 may also include a telephone (POTS) system, and/or a cellular network in addition to digital data networks. Other networks such as card network 115 may connect card authorization organizations 142 with card computing platform 106.

The computing environment also may include one or more card interface devices, such as point-of-sale terminal 110 and/or ATM 112. A point-of-sale terminal 110 and/or an ATM 112 may include a card-reading interface, such as an EMV chip interface, an image capture device, a magnetic stripe reader, and/or a contactless reader (e.g., near-field communication (NFC), radio-frequency identification (RFID)). The one or more card interface devices, such as point-of-sale terminal 110 and/or automated teller machine 112, are connected to a power source. The one or more card interface devices, such as a point-of-sale terminal 110 and/or ATM 112, may be configured to send information to and receive information from the card alert computing platform 106. This may include, for example, card authentication information, image capture data, purchase information, and/or card update information (e.g., updated card number, expiration date, name, offers, or the like for display).

The computing environment may also include one or more variant cards 102 (e.g., credit cards, debit cards, ATM cards, and/or gift cards). In some arrangements, variant cards 102 may be contactless payment cards.

Figure 2:
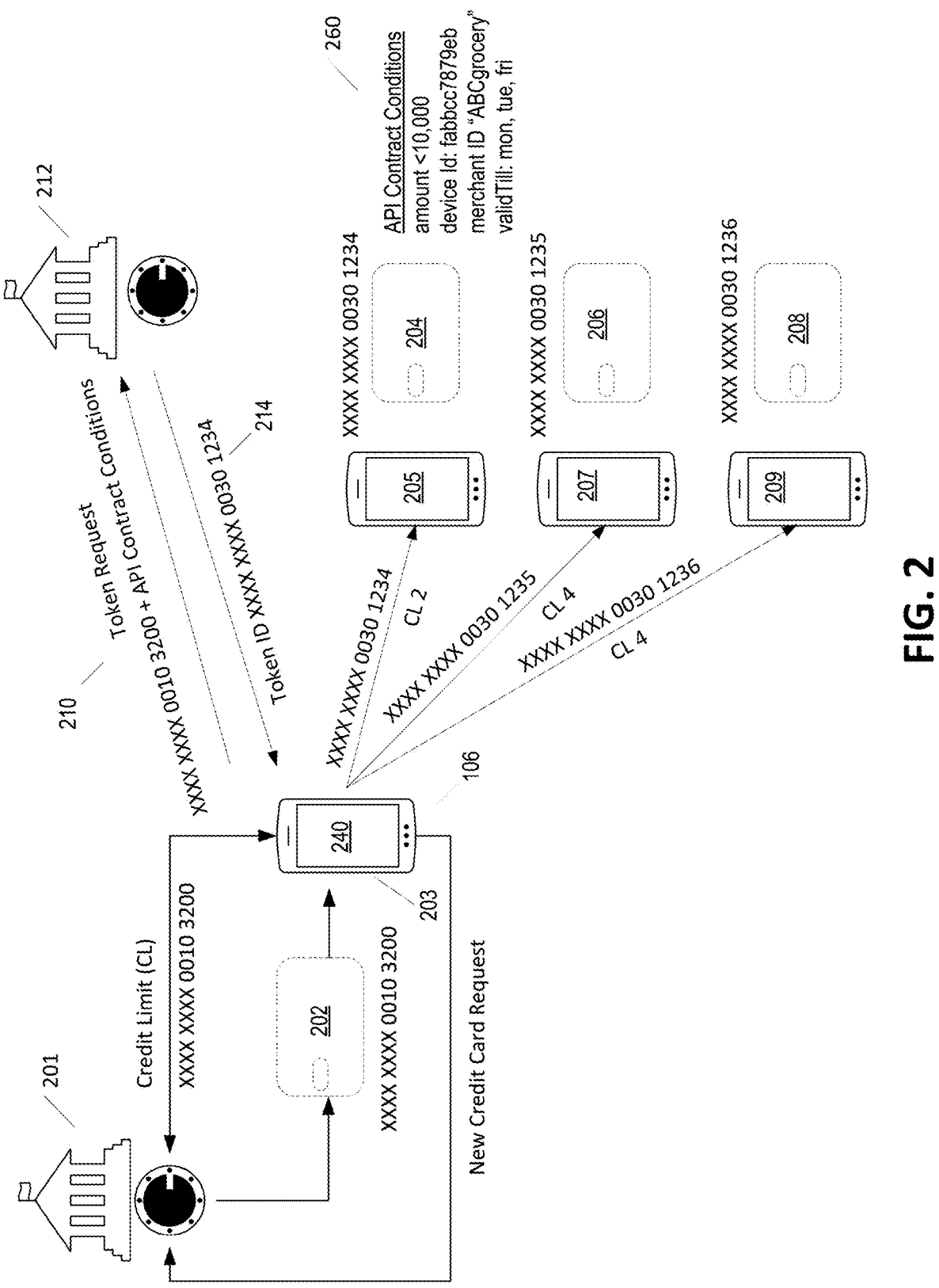
FIG. 2 illustrates generation of variant cards ins accordance with one or more aspects described herein.

FIG. 2 illustrates generation of variant cards in accordance with an embodiment of disclosure. In an embodiment, variant card generation, maintenance, and associated controls are implemented through an application and API service. The application and API service may use tokenization to create instances of variant cards for various sub users. The process removes dependency on financial institutions in generating, maintaining, and controlling payment cards. In an aspect of the disclosure, variant cards are generated, controlled and maintained by computing platform 106 which authorized creation of the sub user variant accounts. In an embodiment, the generated variant cards are not controlled by the financial institution associated with the original account.

As illustrated in FIG. 2, an original payment card issuer 201 may after an onboarding process issue an original payment card 202 to a user. The original payment card 202 may be a digital payment card or a physical payment card for use in conducting payment transactions. In an embodiment, the original payment card issuer 201 may be a financial institution. The original payment card 202 may be associated with a user account and include features such as a credit limit ("CL") amount, a unique identification number, and security features to prevent unauthorized access and use of original payment card 202.

In an embodiment, card computing platform 106 may control variant card issuance and features using credit limit management, sub account prioritization, restriction controls, and card blocking/removal features. In an embodiment, card computing platform 106 may issue an unlimited number of variant cards based on bifurcation of the original account credit limit. For instance, as shown in FIG. 2, card computing platform 106 through a mobile application 240 on user device 203 may generate variant cards 204, 206, and 208.

Variant cards 204, 206, and 208 may be digital payment cards that reside on user devices 205, 207, and 209. Each of the generated variant cards 204, 206, and 208 may be assigned a CL amount that in total does not exceed the original payment card 202 issued CL amount. For instance, original payment card 202 may have a CL amount of $15,000 dollars. In an embodiment, computing platform 106 may establish credit limits by tiered amounts such as a CL2 of $3000, a CL3 of $3500, and a CL4 of $5,000. In an embodiment, each generated variant card may be assigned one of the established credit limits by computing platform 106 so long as the total does not exceed the original payment cards 202 issued CL amount. Variant cards 204, 206, and 208 may be generated in real-time without the onboarding process associated with original payment card issuer 201.

As shown in FIG. 2, card computing platform 106 may transmit a token request 210 to card network service provider 212. In an embodiment, card network service provider 212 may also include a token service. The token request 210 may include API contract conditions for generation of a new variant card. In an embodiment, API contract conditions may include the CL amount, device identification, merchant identification, and validTill information (i.e., date validTill, number of transactions allowed, valid transaction days, allowance of international transactions or domestic only transactions, etc.). For instance, FIG. 2 illustrates one exemplary set of contract conditions 260 for variant card 204 that includes a credit limit amount to be less than $10,000, a device identification number of "fabbcc7879eb". a merchant identifier of "ABCgrocery", and a vailidTill of Monday, Tuesday, and Friday. Those skilled in the art will realize that each variant card may have a number of different API contract conditions.

In an aspect of the disclosure, card network service provider 212 may generate a token ID 214 based on the received token request 210. In an embodiment, the token ID may be a variant card identification number issued by card network service provider 212.

Each of the generated variant cards 204, 206, and 208 may be managed through card computing platform 106. Management of each of the variant cards may include issuing an individual CL to each variant card which does not exceed the API contract amount for the variant card.

Figure 3:
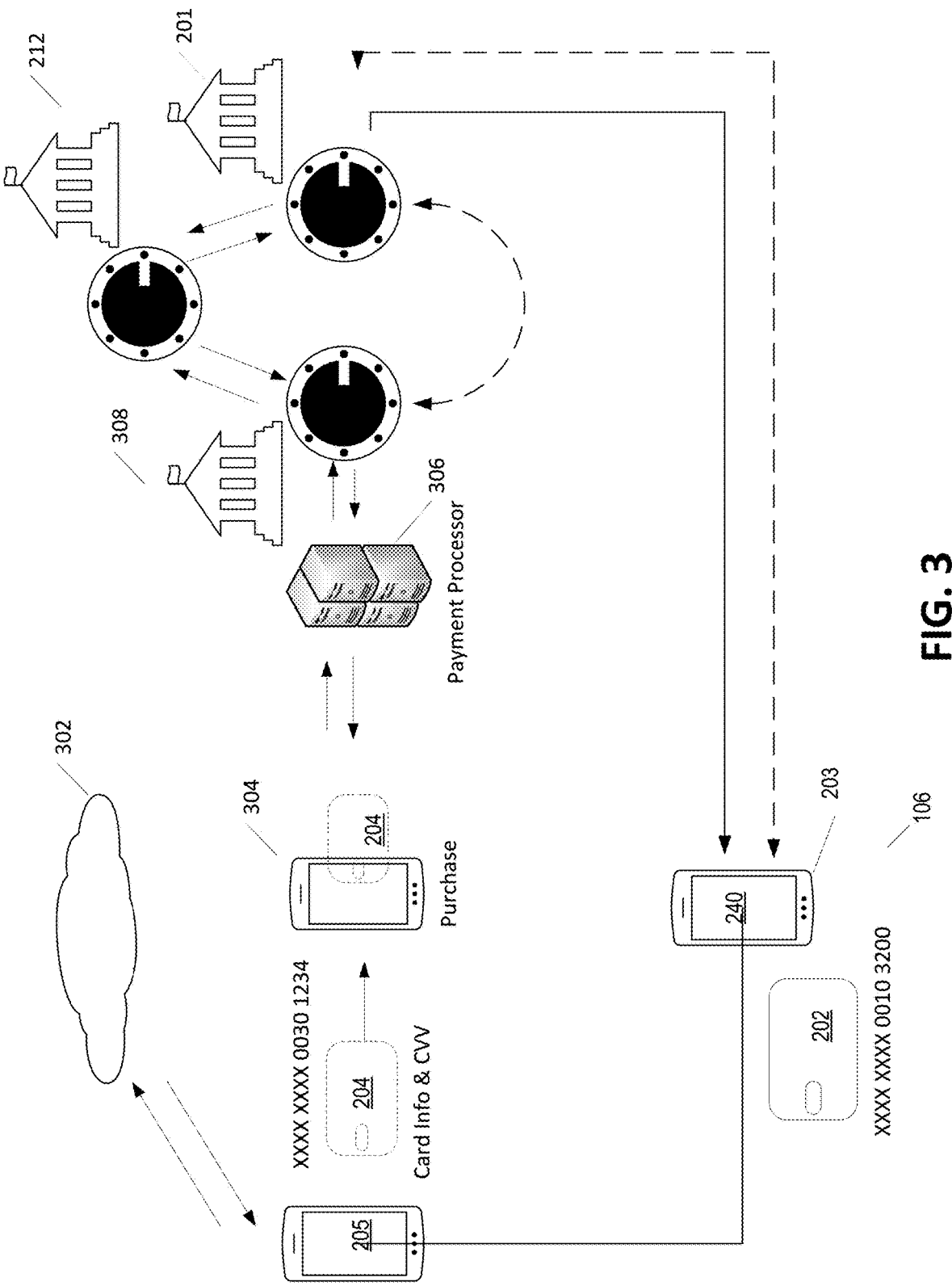
FIG. 3 illustrates a variance card transaction in accordance with one or more aspects described herein.

FIG. 3 illustrates a purchase transaction flow using a generated variant card in accordance with an aspect of the disclosure. In FIG. 3, variant card 204 may be used to make a purchase at a retailer. At time of transaction, variant card 204 may receive a dynamic card verification value "CVV" generated and received from card network 302. In an embodiment, card computing platform 106 may transmit to a dynamic CVV2 generation API associated with card network 302, a request for a dynamic CVV. Upon receipt of the dynamic CVV, variant card information including the dynamic CVV may be transmitted to retailer purchase processing apparatus 304. The received variant card information may be transmitted from retailer purchase processing apparatus 304 to a payment processor 306 which transmits variant card information to acquirer financial institution 308. Acquirer financial institution 308 may transmit the token identification number associated with the variant card along with the dynamic CVV to card network 212 to authenticate the variant card. Card network 212 may also compare the transaction details to the API contract conditions for the variant card to verify that the transaction meets all the contract conditions.

In an embodiment, card network 212 determines the original primary account number of the original card 202 from the received token identification number. Card network 212 may transmit the determined original primary account number to the original payment card issuer 201 for verification. In an embodiment, original payment card issuer 201 may receive the original primary account number from card network 212. Original payment card issuer 201 verifies the received primary account number and transmits verification back to card network 212. An authorization message may be forwarded to the acquirer financial institution 308 from card network 212 based on received verification from the original payment card issuer 201. A payment authorization message may be transmitted from acquirer financial institution 308 to payment processor 306 through to retailer purchasing processing apparatus 304.

In an aspect of the disclosure, original payment card issuer 201 may forward transaction information along with statement information to computing platform 106 through mobile application 240 on user device 203. Additionally, computing platform 106 may display monthly bills and allow for bill payment to original payment card issuer 201.

Figure 4:
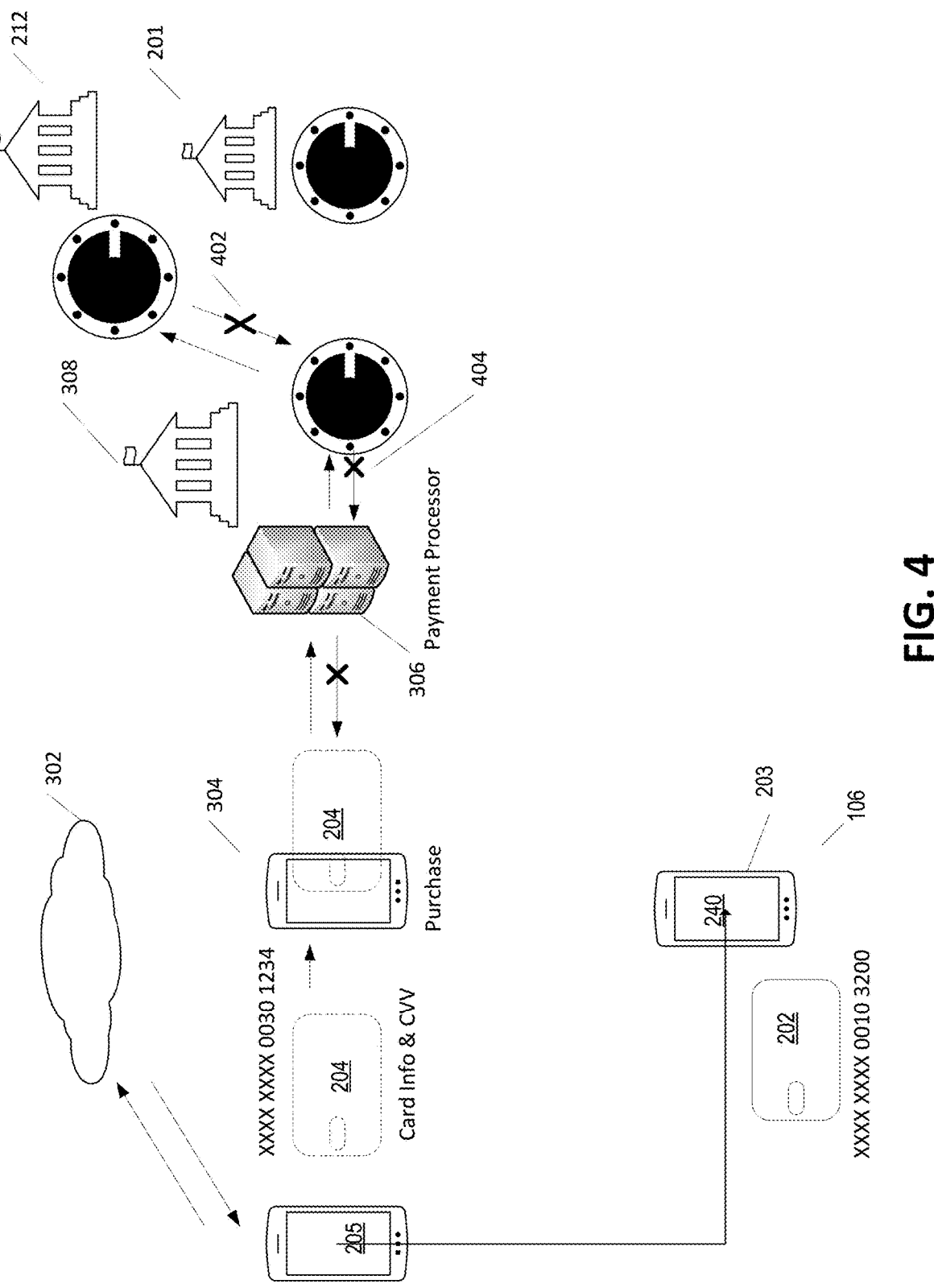
FIG. 4 illustrates an additional variance card transaction in accordance with one or more aspects described herein.

FIG. 4 illustrates a denied purchase transaction flow using a generated variant card in accordance with an aspect of the disclosure. In FIG. 4, variant card 204 may be used to make a purchase at a retailer. At time of transaction, variant card 204 may receive a dynamic card verification value "CVV" generated and received from card network 302. In an embodiment, card computing platform 106 may transmit to a dynamic CVV2 generation API associated with card network 302, a request for a dynamic CVV. Upon receipt of the dynamic CVV, variant card information including the dynamic CVV may be transmitted to retailer purchase processing apparatus 304. The received variant card information may be transmitted from retailer purchase processing apparatus 304 to a payment processor 306 which transmits variant card information to acquirer financial institution 308. Acquirer financial institution 308 may transmit the token identification number associated with the variant card along with the dynamic CVV to card network 212 to authenticate the variant card. Card network 212 may also compare the transaction details to the API contract conditions for the variant card to verify that the transaction meets all the contract conditions. In an embodiment, if the transaction does not meet all the contract conditions, the transaction will be declined by card network 212. For instance, if the total dollar amount of the transaction exceeds the CL of variant card 204, card network will decline the transaction and transmit a declined message 402 to acquirer financial institution 308. A payment declined message 404 may also be transmitted from acquirer financial institution 308 to payment processor 306 through to retailer purchasing processing apparatus 304.

Figure 5:
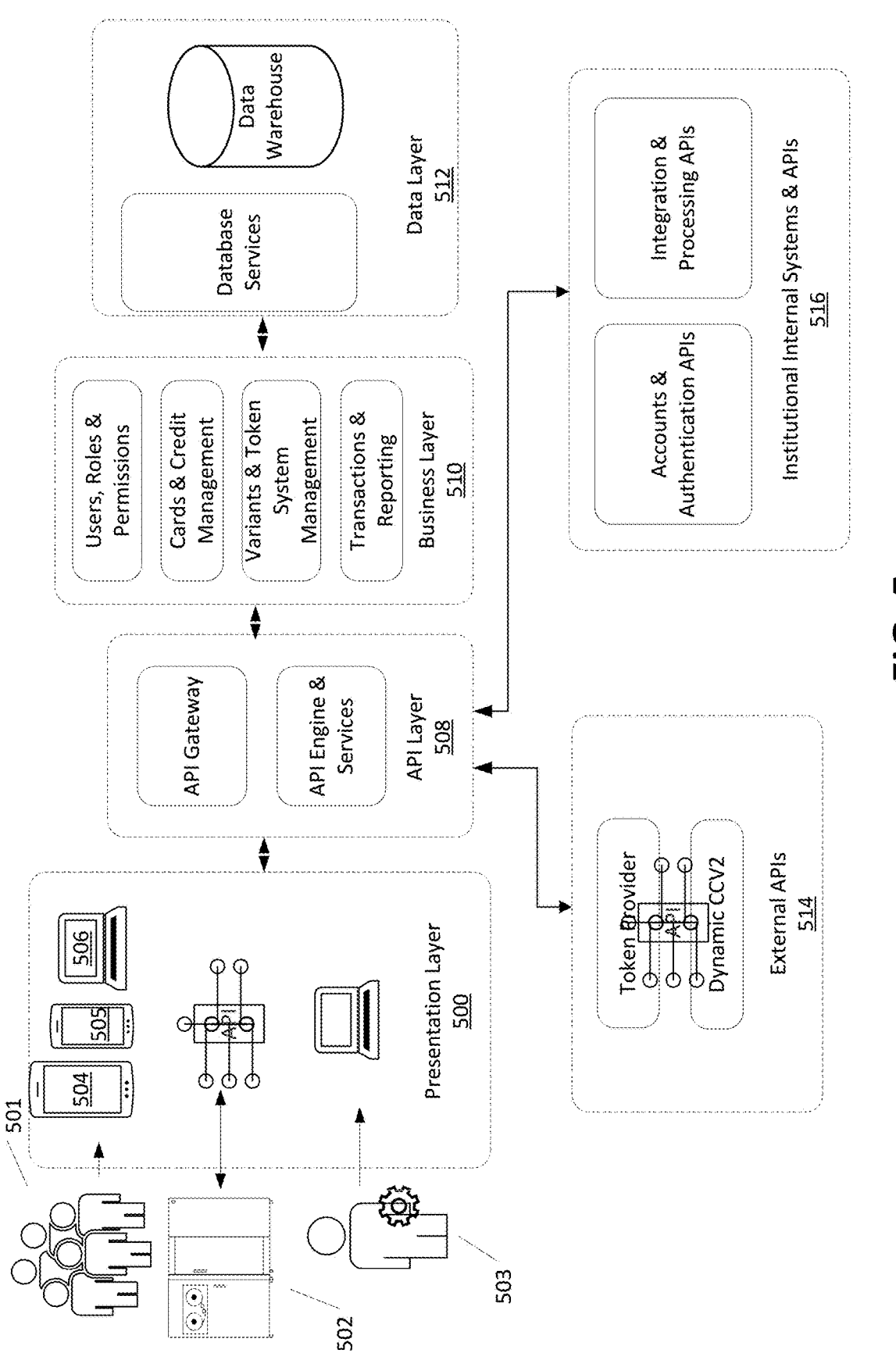
FIG. 5 depicts a high-level architecture for generation and use of variant cards in accordance with one or more aspects described herein.

FIG. 5 illustrates a variant card architecture for implementing a card computing platform in accordance with one or more computing devices and/or other computing system. As shown in FIG. 5, a presentation layer 500 may interact with different users 501, systems 502, and system administrators 503. The presentation layer 500 may communicate with API layer 508 including an API gateway and an API engine and services. The API layer 508 may also communicate with external APIs 514 that include a token provider API and a Dynamic CVV2 API. Additionally, API layer 508 may communicate with various institutional internal systems and APIs 516. The card computing platform of FIG. 5 may also include a business layer 510 for conducting payment transactions and a data layer 512 for handling and storing of various data formats and content.

Figure 6:
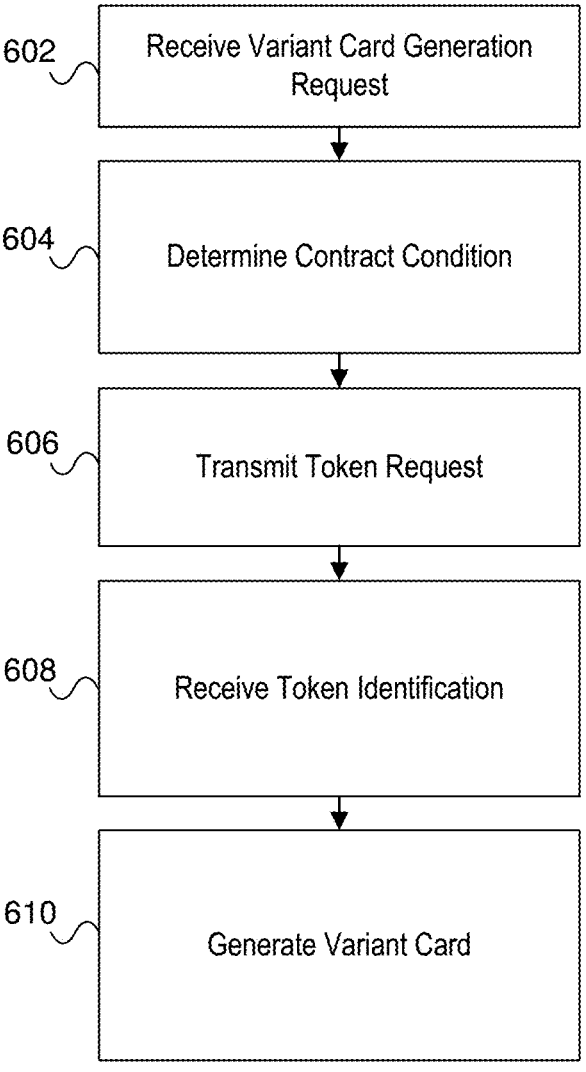
FIG. 6 depicts an illustrative method for generating variant cards in accordance with one or more aspects described herein.

FIG. 6 depicts an illustrative method of generating a variant card in accordance with one or more exemplary embodiments. In FIG. 6, at step 602, a card computing platform 106 may receive a variant card generation request based on an existing purchasing card. At step 604, card computing platform 106 may determine at least one contract condition to be associated with the variant card generation request. At step 606, card computing platform 106 may transmit a token request to a card network. The token request may include the at least one contract condition. At step 608, card computing platform 106 may receive a token identification. At step 610, card computing platform 106 may generate a variant card based on the received token identification and the at least one contract condition. In an embodiment, the generated variant card may be associated with the existing original purchasing card.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the disclosure.

What is claimed is:

1. A computer-implemented method for generating and managing digital variant cards for sub-users, the method comprising:

receiving, by a processor of a distributed card computing platform (DCCP), a request from an authorized user through a mobile application to generate one or more digital variant cards for one or more sub-users;

determining, by the processor of the DCCP, contract conditions defined by secure application programming interface (API) contracts for each digital variant card, the contract conditions comprising:

a portion of a credit limit of the authorized user to be shared with a respective sub- user, a specific device of the respective sub-user identified by a device identifier, one or more merchant identifiers specifying one or more merchants where a respective digital variant card can be used, a maximum transaction amount for each transaction, a total number of transactions allowed for the respective digital variant card, a validity period defined by a start date and an end date, a geographic restriction specifying that the respective digital variant card can only be used for domestic transactions or within a specific geographic area, and specific days of week during which the respective digital variant card is valid;

embedding, by the processor of the DCCP, the contract conditions as executable contract parameters directly into a token request;

transmitting, by the processor of the DCCP via an API service layer of the DCCP, the token request to a payment card network service provider (PCNSP) system;

receiving, by the processor of the DCCP, a token identifier (ID) from the PCNSP system, the token ID incorporating the embedded executable contract parameters;

generating, by the processor of the DCCP, a digital variant card for each sub-user associated with a respective token ID and linked to an original payment card of the authorized user such that the digital variant card shares the determined portion of the credit limit;

provisioning, by the processor of the DCCP, each digital variant card on its respective associated sub-user device via a secure communication channel by binding the each digital variant card to its designated device identifier using token-based binding and tokenization;

performing, by a processor of the PCNSP system in communication with the DCCP, real- time network-level enforcement of the embedded executable contract parameters by:

generating a per-transaction dynamic card verification value (CVV) via a dynamic CVV generation API, routing a digital variant card information including the per-transaction dynamic CVV from the specific sub-user device through a retailer purchase processing apparatus, a payment processor, and an acquirer financial institution, evaluating, using a rules-based engine, transaction details directly against the contract conditions embedded in the token ID to verify compliance with the contract conditions, determining an original primary account number of the original payment card from the token ID, transmitting the original primary account number to an original payment card issuer for verification, receiving the verification from the original payment card issuer, and forwarding an authorization message to the acquirer financial institution based on the verification for routing the authorization message to the payment processor and the retailer purchase processing apparatus;

monitoring, by the processor of the DCCP through the API service layer, transactions performed with the each digital variant card and delivering real-time alerts of the transactions to the authorized user via the mobile application;

enabling, by the processor of the DCCP, the authorized user to block or remove any of the digital variant cards in real time through the mobile application;

synchronizing, by the processor of the DCCP, credit usage across the digital variant cards in real time via API aggregation of token data to ensure the credit usage does not exceed the credit limit of the original payment card; and consolidating, by the processor of the DCCP, bill payments for all transactions made with the digital variant cards and the original payment card into a single billing statement by:

receiving transaction information and statement information forwarded from the original payment card issuer through the mobile application, displaying monthly bills via the mobile application, and enabling bill payment to the original payment card issuer from the mobile application; and performing the generating, provisioning, monitoring, synchronizing, and consolidating steps in real-time without intervention from the issuing financial institution of the original payment card while the DCCP communicates with user devices and the via one or more networks selected from: wired networks, wireless networks, and cellular networks.

2. A distributed payment card processing system for generating and managing digital variant cards for sub-users using secure tokenization and runtime technical authentication comprising:

a distributed card computing platform (DCCP), a payment card network service provider (PCNSP) system, one or more sub-user devices, point-of-sale terminals, and automated teller machines in communication via one or more networks selected from: wired networks, wireless networks, and cellular networks, the system further comprising:

the DCCP hosted in a data center comprising:

a presentation layer that interacts with users, systems, and system administrators, an application programming interface (API) layer including an API gateway, an API engine, and services that communicate with external token provider APIs and dynamic card verification value (CVV) APIs as well as institutional internal systems and APIs, a business layer for conducting payment transactions, and a data layer for handling and storing various data formats and content, at least one processor, and a non-transitory memory storing computer-executable instructions that, when executed by the at least one processor, configure the DCCP to:

receive a request from an authorized user through a mobile application to generate one or more digital variant cards for one or more sub-users;

determine contract conditions defined by secure API contracts for each digital variant card, the contract conditions comprising:

a portion of a credit limit of the authorized user to be shared with a respective sub-user, a specific device of the respective sub-user identified by a device identifier, one or more merchant identifiers specifying one or more merchants where a respective digital variant card can be used, a maximum transaction amount for each transaction, a total number of transactions allowed for the respective digital variant card, a validity period defined by a start date and an end date, a geographic restriction specifying that the respective digital variant card can only be used for domestic transactions or within a specific geographic area, and specific days of week during which the respective digital variant card is valid;

embed the contract conditions as executable contract parameters directly into a token request;

transmit, via an API service layer, the token request to the PCNSP system;

receive a token identifier (ID) from the PCNSP system, the token ID incorporating the embedded executable contract parameters;

generate a digital variant card for each sub-user associated with a respective token ID and linked to an original payment card of the authorized user such that the digital variant card shares the determined portion of the credit limit;

provision each digital variant card on its respective associated sub-user device via a secure communication channel by binding the each digital variant card to its designated device identifier using token-based binding and tokenization;

monitor, through the API service layer, transactions performed with the each digital variant card and deliver real-time alerts of the transactions to the authorized user via the mobile application;

enable the authorized user to block or remove any of the digital variant cards in real time through the mobile application;

synchronize credit usage across the digital variant cards in real time via API aggregation of token data to ensure the credit usage does not exceed the credit limit of the original payment card; and consolidate bill payments for all transactions made with the digital variant cards and the original payment card into a single billing statement by:

receiving transaction information and statement information forwarded from the original payment card issuer through the mobile application, displaying monthly bills via the mobile application, and enabling bill payment to the original payment card issuer from the mobile application;

the PCNSP system comprising:

at least one processor, and a memory storing executable instructions that, when executed by the at least one processor, configure the PCNSP system to:

generate token IDs that incorporate the embedded executable contract parameters;

generate a per-transaction dynamic CVV via a dynamic CVV generation API;

route a digital variant card information including the per-transmission dynamic CVV from the specific sub-user device through a retailer purchase processing apparatus, a payment processor, and an acquirer financial institution;

evaluate, using a rules-based engine, transaction details directly against the contract conditions embedded in the token ID to verify compliance with the contract conditions;

determine an original primary account number of the original payment card from the token ID;

transmit the original primary account number to an original payment card issuer for verification;

receive the verification from the original payment card issuer; and forward an authorization message to the acquirer financial institution based on the verification for routing the authorization message to the payment processor and the retailer purchase processing apparatus;

the one or more sub-user devices configured to store and use provisioned digital variant cards bound to specific device identifiers using token-based device binding; and the point-of-sale terminals and the automated teller machines configured to:

process transactions using digital variant cards, verify dynamic CVVs provided by the PCNSP system, and transmit transaction requests for authorization.

* * * * *